Figure 1:
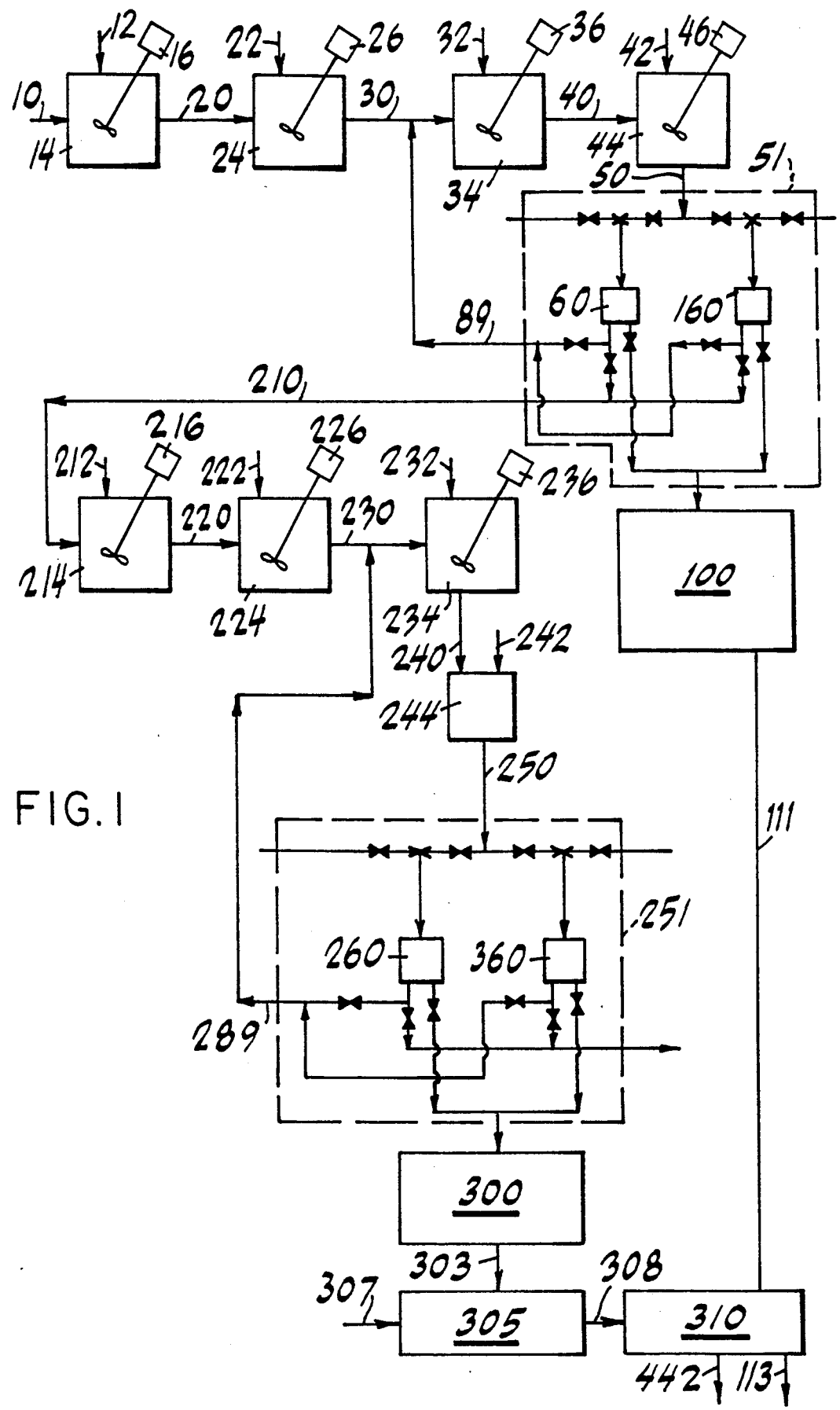

United States Patent [19]
Stewart et al.

[11] Patent Number: 5,128,047
[45] Date of Patent: Jul. 7, 1992

[54] SEQUENTIAL SEPARATION OF METALS BY CONTROLLED PH PRECIPITATION

[75] Inventors: John M. Stewart, Franklin, Tenn.; George Chan, Hercules, Calif.

[73] Assignee: Rhone-Poulenc, Inc., Princeton, N.J.

[21] Appl. No.: 512,653

[22] Filed: Apr. 20, 1990

[51] Int. Cl.[5] .............................................. C02F 1/64
[52] U.S. Cl. ................... 210/724; 210/912; 210/738; 210/727; 423/102; 423/104; 423/142; 423/106
[58] Field of Search ............... 210/724, 725, 726, 727, 210/912, 738, 769; 423/102, 104, 142, 140, 106, 109

[56] References Cited

U.S. PATENT DOCUMENTS

| | | | |
|---|---|---|---|
| 3,800,024 | 3/1974 | Forsell et al. | 210/726 |
| 3,886,258 | 5/1975 | Cosgrove | 423/106 |
| 3,976,743 | 8/1976 | Landucci et al. | 423/101 |
| 3,985,858 | 10/1976 | Cosgrove | 423/106 |
| 4,018,680 | 4/1977 | Kupfer | 423/104 |
| 4,124,462 | 11/1978 | Reinhardt et al. | 423/109 |
| 4,176,160 | 11/1979 | Pavonet | 423/104 |
| 4,338,200 | 7/1982 | Zeijlstra | 210/912 |
| 4,342,653 | 8/1982 | Halverson | 210/912 |
| 4,343,706 | 8/1982 | Etzel et al. | 210/724 |
| 4,566,975 | 1/1986 | Allgulin | 210/724 |
| 4,610,722 | 9/1986 | Duyvesteyn | 423/109 |
| 4,680,126 | 7/1987 | Frankard et al. | 210/712 |

FOREIGN PATENT DOCUMENTS

| | | | |
|---|---|---|---|
| 113795 | 10/1978 | Japan | 210/724 |
| 2116537 | 9/1983 | United Kingdom | 210/724 |

OTHER PUBLICATIONS

SULFEX TM Heavy Metals Waste Treatment Process, Permutit® Technical Bulletin vol. XIII, No. 6 (1976).
Kue et al., The Effect of Weak Chelating Agents on the Removal of Heavy Metals by Precipitation Processes, 5 Environmental Progress, No. 3, FIG. 1 (Aug. 1988) (Annotated Version of FIG. 1).
Process Flowsheet for "Heavy Metals Removal" (Aug. 1984).

Primary Examiner—Stanley S. Silverman
Assistant Examiner—Neil M. McCarthy
Attorney, Agent, or Firm—Morgan & Finnegan

[57] ABSTRACT

A process for separately removing zinc and iron from acidic wastewater. The process involves adding alkali metal hydroxide to the acidic wastewater (below about pH 4) to achieve a first pH of about 4.8 to at most about 5.4 and precipitate an iron hydroxide-containing precipitate at this pH. The precipitate from the wastewater is separated and then additional alkali metal hydroxide is added to achieve a second pH in the range from about 8.8 to about 9.4. A zinc hydroxide containing precipitate forms at this second pH and is then recovered by filtration.

31 Claims, 3 Drawing Sheets

SEQUENTIAL SEPARATION OF METALS BY CONTROLLED PH PRECIPITATION

I. BACKGROUND OF THE INVENTION

1. Field Of The Invention

The present invention relates to a process for separation of iron ions with associated heavy metals from zinc ions and lighter metals in concentrated acidic wastewater. More particularly, the present invention separates these metals at different steps by controlling the pH at each step.

2. Discussion Of Background References

There are many mining leachate collection ponds, and other mixed metal solutions that are considered as hazardous waste due to the presence of soluble metals. Typical ponds are in the western United States and contain zinc, iron, and other heavy metals. Due to environmental considerations for the receiving aquatic communities, the environmental regulatory agencies have been placing fairly low limits on these metals contained in wastewaters discharged to state and federal water ways. Therefore, many industrial plants as well as municipalities that have leachate evaporative catch basins installed in their natural surface water shed areas will have to remove the metal components from these impoundments before the waters can be discharged.

Historically, water treatment to clarify water has been undertaken by using aluminum and ferric salts or more recently polyacrylamides. In these processes, the operating zone has generally been in the neutral pH range, 6.5 to 7.5. Within this range, ferric and aluminum salts are within their lowest solubility range as hydrated hydroxides. However, within this range, other metallic ions such as zinc, magnesium, cadmium, copper, lead, etc. continue to have a high solubility level and remain in the purified liquid.

In the past, these levels of metals were acceptable in effluents being discharged from first generation treating facilities (pH adjustment/solids settling). With the development of environment concern and subsequent experimentation to reduce discharged metal levels, a second level of effluent treatment processes has been developed. In these schemes, ferric hydroxide is formed to act as the attaching medium to agglomerate and precipitate the particular materials formed. It has been noted that selenium and vanadium ions tend to be adsorbed on these iron flocs so that this method has an additional benefit of removing other metals of concern.

Several systems have been developed to address the metals removal problem. Examples of these systems include the Permutit-SULFEX TM and Durion-heavy metals waste treatment processes. These systems perform a single precipitation at a specific pH level. These systems generate a single highly hydrated, combined metal hydroxide/sulfide sludge that typically is landfilled. However, the resultant treated wastewaters from these processes still contain significant levels of heavy metals. In some cases, the single pH operating level allowed certain metals to precipitate and then partially redissolve before final precipitation and filtration. Alternatively, at the single pH level, the minimum solubility point of some of the metals present was not reached. As a result, a significant level of several metals remained in solution to be discharged in the wastewater.

U.S. Pat. No. 4,680,126 to Frankard, et al. discloses separation and recovery of reusable heavy metal hydroxides from metal finishing wastewaters. This reference discloses precipitating ferrous metal ions present while maintaining the non-ferrous metal ions in solution and isolating the precipitate. Then the reference discloses precipitating the non-ferrous metal ions from solution. However, this reference discloses a method for treating wastewaters which initially have an alkaline pH.

A need exists for a commercial process for treating acidic wastewaters such as mining leachate.

II. SUMMARY OF THE INVENTION

It is an object of the present invention to provide a process, for treating acidic wastewater, such as mining leachates containing iron, zinc, and optionally other metal ions, which results in separating the iron ions as a first precipitate and then separating the zinc ions as a second precipitate.

The present invention provides a process involving two precipitation steps to separately precipitate iron and then zinc from initially acidic wastewater. Typically the acidic wastewater is a mining leachate having a pH in the range from about 3 to about 4. The process includes a first precipitation step in which a ferric hydroxide precipitate is formed by raising the leachate pH within the range from about 4.8 to about 5.4, preferably from about 5.0 to about 5.4, and most preferably from about 5.2 to about 5.4. Rather than employ a single reactor vessel to achieve the desired pH, it is preferable to employ 2 or more reactors in series. Most preferably this pH is quickly raised to a pH in the range from about 4 to about 5 in a first reactor vessel and then further raised in one or more subsequent vessels to the desired pH. The precipitate discharge from the last of these vessels passes through a filter to separate the precipitate. The remaining liquid filtrate is discharged from the filter. In a subsequent step, the pH of the filtrate is raised to a value in the range from about 8.8 to about 9.4, preferably from about 9.3 to about 9.4. Rather than employ a single reactor vessel to achieve the desired pH, it is preferable to employ 2 or more reactors in series. Most preferably this pH is achieved by quickly raising the pH of the filtrate to at most 9.0 in a single reactor and then, in one or more subsequent reactors, further raising the pH to the desired value. This develops a zinc hydroxide based floc which is removed by filtration. If desired, the ferric hydroxide-containing precipitate can be pelletized. Also if desired, the zinc hydroxide-containing precipitate can be pelletized or converted to zinc sulfate and then pelletized. The pelletized zinc sulfate-containing precipitate is useful as a fertilizer additive. The pelletized ferric-hydroxide containing precipitate is useful as an additive for bricks.

III. BRIEF DESCRIPTION OF THE DRAWINGS

Figure 2:
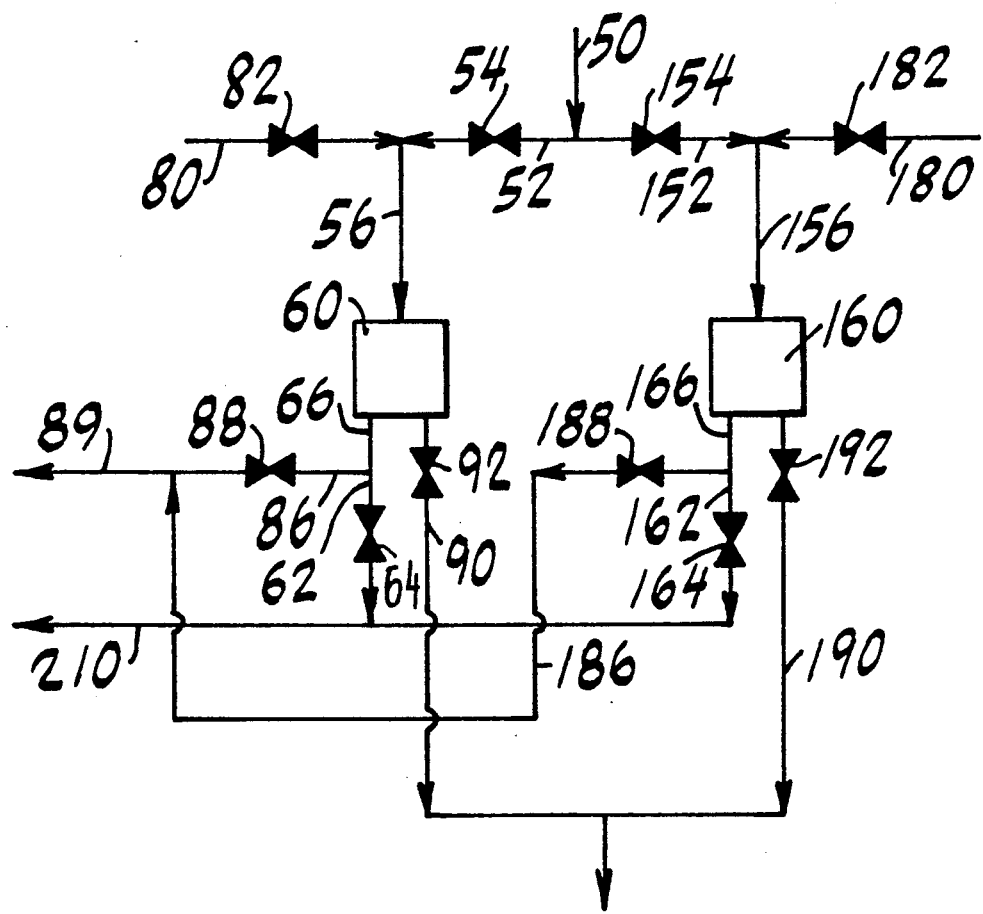
Figure 3:
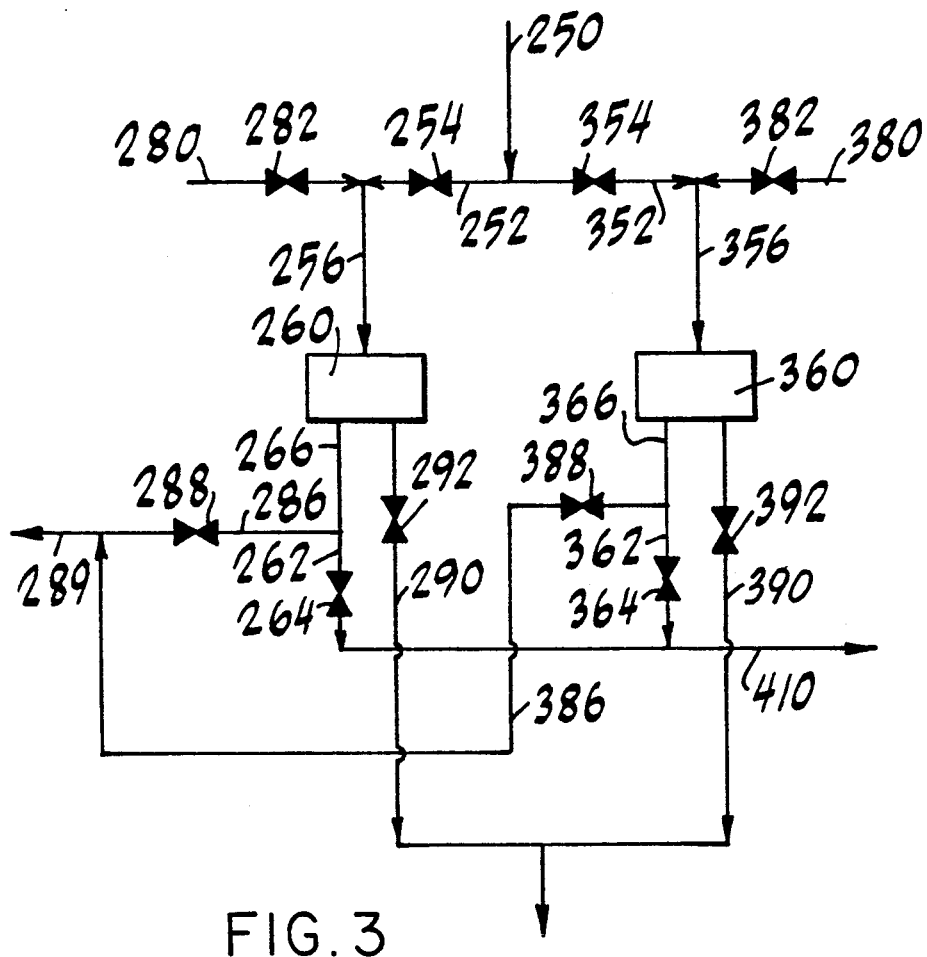

FIG. 1 discloses a first embodiment of the process of the present invention;

FIG. 2 discloses details of a first portion of FIG. 1;

FIG. 3 discloses details of a second portion of FIG. 1; and

Figure 4:
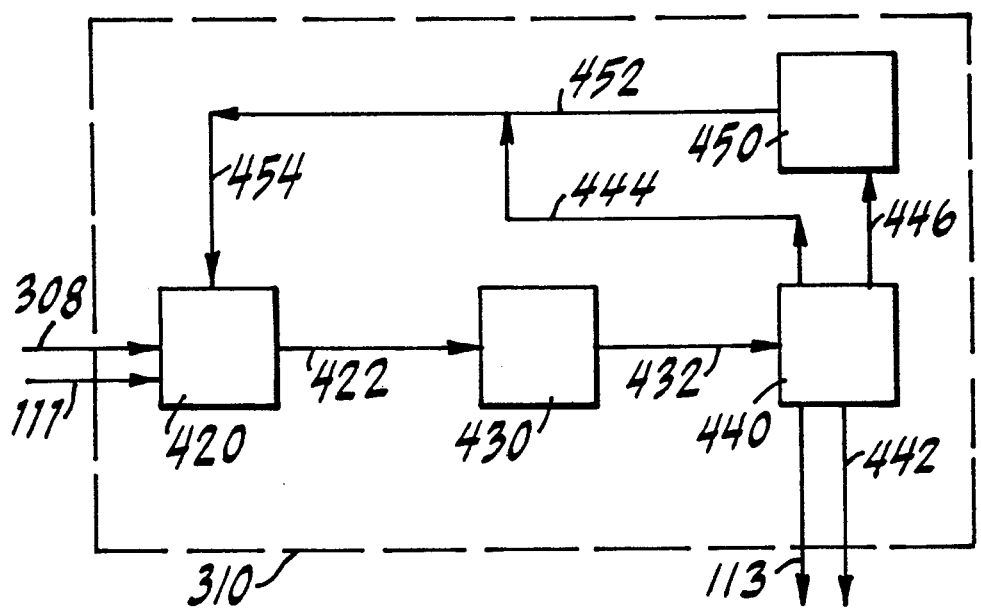

FIG. 4 discloses means for pelletizing zinc sulfate-containing precipitate.

IV. DETAILED DESCRIPTION OF THE INVENTION

FIG. 1 discloses an embodiment of the present invention. An acidic wastewater stream passes through an acidic wastewater conduit 10 into a first agitated vessel 14. The vessel 14 is agitated by a first agitator 16. The acidic wastewater typically contains iron ions in the ferric state, copper, manganese, aluminum, zinc, nickel, chromium and other trace metals. The agitator 16, as well as agitators to be described below, provide a relatively gentle agitation to avoid breaking up the floxs as they develop. A typical agitator has a 2-3 horsepower drive for a vessel 14 having a typical volume of about 2,000 gallons. The acidic wastewater typically has a pH of less than about 4, most typically from about 3.0 to about 4.0. A stream comprising alkali metal hydroxide, such as sodium hydroxide or potassium hydroxide, preferably sodium hydroxide, passes through a first alkali metal hydroxide conduit 12 into the first agitated vessel 14. It is undesirable to adjust pH with carbonate compounds. The carbonate compounds interfere with obtaining separate ferric hydroxide-containing cakes and zinc hydroxide-containing cakes. In vessel 14, the alkali metal hydroxide mixes with the acidic wastewater. The alkali metal hydroxide and acidic wastewater are fed to the vessel 14 to maintain a pH from about 4.0 to about 5.0. The residence time for liquid in the first agitated vessel 14 preferably ranges from 15 to about 25 minutes. A typical liquid residence time in the first agitated vessel 14 would be about 20 minutes.

The present invention may be operated in a batch or continuous mode. However, the continuous mode is preferable and illustrated by FIG. 1. Accordingly, the first agitated vessel 14 is a continuous stirred tank reactor. Mixing acidic wastewater and alkali metal hydroxide, at the above-described pH, forms a ferric-hydroxide-containing precipitate. Preferably, the acidic wastewater is quickly neutralized to a pH having a value of about 4.0 to about 5.0 in the first agitated vessel 14. The rapid increase in pH prevents preferentially forming either complex ferric/metal salts or insoluble, dense ferric oxide/hydroxide salts. The resulting ferric hydroxide forms a moderately dense, large floc that does not settle rapidly. However, the floc does provide surface for trace metal adsorption and removal, particularly for selenium and vanadium. The mixture of precipitated floc and wastewater is then continuously discharged from the first agitated vessel 14 as a first liquid effluent stream which passes through a first effluent conduit 20 into a second agitated vessel 24.

A second stream which comprises alkali metal hydroxides, preferably sodium hydroxide, passes through a second alkali metal hydroxide conduit 22 into the second agitated vessel 24. As used in this specification, alkali metal hydroxide is typically potassium hydroxide or sodium hydroxide, preferably sodium hydroxide. Sufficient alkali metal hydroxide is mixed with the first liquid effluent stream in the second agitated vessel 24 to form a mixture having a pH in the range from about 4.8 to 5.4, preferably from about 5.0 to about 5.4 and most preferably from about 5.0 to about 5.1. Due to the pH at which the mixture in the second agitated vessel 24 is maintained, additional precipitation occurs in the second agitated vessel 24. Second agitated vessel 24 is provided with a second agitator 26 to agitate the mixture in the vessel. Typically the agitator 26 provides a sufficiently gentle agitation to avoid breaking flocs of precipitate. Thus, a typical second agitator 26 would have a drive of about 2 to about 3 horsepower for a 2,000 gallon vessel. A typical second agitated vessel 24 has a liquid residence time from about 10 to about 20 minutes. Thus, about 15 minutes could be a typical liquid residence time. The mixture in the second agitated vessel 24 continuously discharges from the second agitated vessel 24 as a second effluent stream which passes through a second effluent conduit 30 into a third agitated vessel 34.

Sufficient alkali metal hydroxide, preferably sodium hydroxide, is fed to the third agitated vessel 34 to mix with the second effluent stream and maintain a mixture in the third agitated vessel having a pH which typically is in the range from about 5.0 to about 5.4, preferably from about 5.2 to about 5.4. The alkali metal hydroxide passes through a third alkali metal hydroxide conduit 32 into the third agitated vessel 34. Due to the pH at which the mixture is maintained, further ferric hydroxide-containing precipitate forms.

A third agitator 36 provides agitation to the mixture in the third agitated vessel 34. Preferably, the third agitator 36 provides sufficiently gentle agitation to avoid breaking flocs of precipitate in the third agitated vessel 34. A typical third agitator 36 has a horsepower in the range from about 2 to about 3 horsepower for a 2,000 gallon agitated vessel. Preferably the residence time in the third agitated vessel 34 is in the range from about 5 to about 15 minutes, most preferably from about 10 to about 15 minutes. Thus, 10 minutes is a typical residence time.

If a sufficient pH is achieved in the second agitated vessel 24, the third agitated vessel 34 may be by-passed, eliminated, or operated as a holding tank with no flow of alkali metal hydroxide through the conduit 32.

The floc-containing mixture in the third agiated vessel 34 is continuously discharged from the third agitated vessel 34 as a third effluent stream which passes through a third effluent conduit 40 into a flocculent addition vessel 44. In the flocculent vessel 44 the third effluent stream is mixed with organic flocculent provided by a first flocculent conduit 42. The vessel 44 is provided with an agitator 46. The agitator 46 provides a sufficiently gentle agitation to avoid breaking the flocs in the flocculent addition vessel 44.

Vessels 14, 24, 34 and 44 all operate at ambient temperature and pressure.

The flocculent-containing mixture in flocculent addition vessel 44 is continuously discharged as a flocculent vessel effluent stream through a flocculent vessel effluent conduit 50 where it passes to one of two parallel filters 60 and 160 located in a first filtration system 51. Filters 60, 160 are operated alternatively such that one filter filters the flocculent vessel effluent stream while the other filter is being cleaned or undergoing some other operation as discussed below.

FIG. 2 shows the first filtration system 51 labeled in detail. When filtering the flocculent vessel effluent stream through filter 60, the following procedure is employed. The flocculent vessel effluent stream passes through the flocculent vessel effluent conduit 50 through a first conduit 52 provided with a valve 54 and then into a second conduit 56 into the filter 60. Preferably filters 60 and 160 contain a vertical filter medium (not shown). In such a filter, the liquid passes horizontally through the vertical filter medium and the filter medium is perpendicular to the ground. Examples of typical filters 60 and 160 which contain a vertical filter medium include a vertical plate filter or a pressure leaf filter. The precipitate is trapped by the filter 60 and the first liquid filtrate discharges from the filter 60 into a first filtrate conduit 66 and then into a filter effluent conduit 62 provided with a valve 64. The first filtrate then passes from conduit 62 into a filtrate conduit 210 and then into a fourth agitated vessel 214.

When the pressure drop in filter 60 becomes sufficiently high, such as about 80-90 pisg (pounds per square inch gauge), then flow of the flocculent vessel effluent stream in conduit 50 is diverted into a first conduit 152 provided with a valve 154 by opening valve 154 and closing valve 54. The flocculent vessel effluent stream then passes through a second conduit 156 into the filter 160. Filter 160 is preferably a vertical plate filter having the same design as filter 60. The ferric hydroxide-containing precipitate is then trapped in filter 160 and the first liquid filtrate is discharged from filter 160 into a first filtrate conduit 166. The first filtrate then passes into a filter effluent conduit 162 provided with a valve 164 which leads to the filtrate conduit 210.

While filter 160 is operating to remove precipitate from the flocculent vessel effluent stream, the precipitate trapped in filter 60 is washed. This is accomplished by passing an acid adjusted pH water stream through an acid adjusted pH water conduit 80 provided with a valve 82. Then the acid adjusted pH water stream passes through the second conduit 56 into the filter 60. The acid adjusted pH water stream has a pH which is about the same as that of the flocculent vessel effluent stream. The acid adjusted pH water stream removes mother liquor and associated dissolved metals from the ferric hydroxide-containing precipitate. This acid adjusted pH water then discharges from filter 60 into the first filtrate conduit 66 and is then diverted into a filter purge conduit 86 provided with a valve 88. This is accomplished by opening valve 88 and closing valve 64. From conduit 86 the acid adjusted pH water stream passes into a conduit 89 and is recycled to the third agitated vessel 34 as shown in FIG. 1.

After washing the precipitate in the filter 60, the flow of acid adjusted pH water from the conduit 80 is stopped, the filter 60 is purged with air to remove free liquid, and then is opened and the precipitate removed and sent to filtered precipitate storage 100. The opening of the filter 60 to remove precipitate and pass it to storage 100 is schematically represented by a filtered ferric hydroxide-containing precipitate conduit 90 provided with a valve 92. However, a typical way to remove the precipitate is by merely opening the filter and letting the precipitate drop out of the filter onto a ground level slab floor underneath the filter 60. Then the precipitate is transferred to the filtered precipitate storage 100 which is typically one or more storage bays. The filtered precipitate may incur some air drying while in storage 100. Then the precipitate is transferred from storage 100 to means for pelleting 310. The transferred precipitate is schematically shown as a stream 111. The pelletized ferric hydroxide-containing product is schematically shown as a stream 113. Pelleting means 310 will be discussed in more detail elsewhere in this specification. The ferric hydroxide-containing pellets are useful as an additive for bricks.

When the pressure drop through filter 160 reaches a suitable value, such as 80-90 psig, then the flow of the flocculent vessel effluent stream from conduit 50 is diverted back to the filter 60 by opening valve 54 and closing valve 154. By this time the formerly trapped precipitate has been washed and removed. While the flocculent vessel effluent stream is being filtered in filter 60 the precipitate trapped in filter 160 is washed by passing an acid adjusted pH water stream through an acid adjusted pH water conduit 180 provided with a valve 182 into the second conduit 156. From second conduit 156, the acid adjusted pH water stream passes into filter 160 and then out of filter 160 through the first filtrate conduit 166. The liquid discharged through the first filtrate conduit 166 is then diverted into a filter purge conduit 186, which is provided with a valve 188, by opening the valve 188 and closing the valve 164. The acid adjusted pH water stream them passes from the filter purge conduit 186 into the conduit 89 and recycles to the third agitated vessel 34.

After the precipitate trapped in filter 160 is washed, the flow of acid adjusted pH water through conduit 180 is stopped, the filter and filter cake are purged with air to remove free liquid and the filter is opened to remove the precipitate. This is schematically indicated by a filtered ferric hydroxide-containing precipitate conduit 190 provided with a valve 192. The removed precipitate then passes to filtered precipitate storage 100 and then to the means for pelletizing 110. The ferric hydroxide containing pellets are discharged from means 310 as the stream 113.

The filtrate in conduit 210 passes into a fourth agitated vessel 214 provided with a fourth agitator 216. In vessel 214 the filtrate mixes with sufficient alkali metal hydroxide, preferably sodium hydroxide, provided by a fourth alkali hydroxide conduit 212 to form a mixture having a pH in the range from about 8.8 to 9.2. Preferably the mixture in the vessel 214 has a pH from about 8.8 to about 9.0. Due to the pH in the fourth agitated vessel 214, a precipitate forms from the mixture within the vessel 214. The precipitate contains zinc hydroxide and other metals such as magnesium. The agitator 216 provides a gentle agitation to avoid breaking flocs as they precipitate in the fourth agitated vessel 214. In a typical embodiment the agitator 216 has a drive from about 2 to about 3 horsepower for a 2,000 gallon vessel. The liquid residencetime typically ranges from about 15 to about 25 minutes. Thus, a typical liquid residence time would be about 20 minutes.

The precipitate-containing mixture in the fourth agitated vessel 214 is discharged as a fourth effluent stream which passes through a fourth effluent conduit 220. The fourth effluent stream then passes into a fifth agitated vessel 224. The fourth effluent stream mixes with sufficient alkali metal hydroxide, preferably sodium hydroxide, to form a mixture in the vessel 224 having a pH in the range from about 9.0 to about 9.4. Preferably the pH is about 9.3 to about 9.4. The alkali metal hydroxide is passed through a fifth alkali metal hydroxide conduit 222 into the fifth agitated vessel 224. Due to the pH of the mixture in the vessel 224, zinc hydroxide-containing precipitate continues to form. The vessel 224 is provided with a fifth agitator 226 which is sufficiently gentle to avoid breaking the flocs of precipitate as they form. A typical liquid residence time in the fifth agitated vessel 224 ranges from about 10 to about 20 minutes. Thus, a typical liquid residence time in the fifth vessel 224 would be about 15 minutes. The precipitate-containing mixture is continuously withdrawn from the fifth agitated vessel 224 as a fifth effluent stream which passes into a fifth effluent conduit 230. The fifth effluent stream then passes into a sixth agitated vessel 234.

In the sixth agitated vessel 234, the fifth effluent stream is mixed with sufficient alkali metal hydroxide, preferably sodium hydroxide, to form a mixture having a pH as high as about 9.4. The alkali metal hydroxide is provided by a sixth alkali metal hydroxide conduit 232. Due to the pH maintained within the sixth agitated vessel 234, additional zinc hydroxide-containing precipitate forms within the vessel 234. The typical liquid residence time in the sixth agitated vessel 234 typically ranges from about 5 to about 15 minutes. Preferably about 10 to about 15 minutes. Thus, a typical liquid residence time in the sixth vessel 224 would be about 10 minutes. Agitation is provided to the sixth agitated vessel 224 by a sixth agitator 236 which is sufficiently gentle to avoid breaking flocs of precipitate as they develop. Thus a typical agitator 236 would have a drive from about 2 to about 3 horsepower for a 2,000 gallon vessel.

The zinc hydroxide-containing mixture is continuously withdrawn from the sixth agitated vessel 234 as a sixth effluent stream which passes through a sixth effluent conduit 240 into an optional lamella settler 244 which acts as a flocculent mixing and effluent holding tank. The lamella settler is a conventional piece of equipment. In the lamella settler 244, the sixth effluent stream is mixed with a second organic flocculent stream provided by a second flocculent conduit 242.

The lamella settler 244 removes a portion of the zinc hydroxide-containing precipitate from the sixth effluent stream and then discharges the remaining liquid and unseparated precipitate as a lamella effluent stream through a conduit 250. The lamella effluent stream then passes alternatively through either a filter 260 or a filter 360 located in a second filter system 251. Filters 260, 360 are arranged such that while one filters the effluent from the lamella settler the other is being cleaned or having other operations performed to it. The detailed operation of the filters 260, 360 is as follows.

FIG. 3 shows the second filter system 251 labeled in detail. The lamella effluent stream passes through the conduit 250 into a first conduit 252 provided with a valve 254 and then into a second conduit 256. From conduit 256 the lamella effluent stream passes into the filter 260 where precipitate is trapped and filtrate discharged through a second filtrate conduit 266. From second filtrate conduit 266 the filtrate passes through a filter effluent conduit 262 provided with a valve 264 and then passes into a product water conduit 410.

The filters 260 and 360 preferably contain vertical filter medium. Typical filters that contain vertical filter medium include a pressure leaf filter or a vertical plate and frame filter. Thus, liquid passes horizontally through the filters 260, 360 and the vertical filter medium is perpendicular to the ground.

When the pressure drop across the filter 260 reaches a suitable value, such as 80-90 psig, flow of the lamella effluent stream to filter 260 is stopped by closing the valve 254. The lamella effluent stream is then diverted to the filter 360. This is accomplished by passing the lamella effluent stream from the conduit 250 into a first conduit 352 provided with a valve 354, which is open. The lamella effluent stream then passes into a second conduit 356 which leads to the filter 360. The filtrate discharges from the filter 360 into a second filtrate conduit 366 and then into a filter effluent conduit 362 provided with a valve 364. From filter effluent conduit 362, the filtrate passes into the product water conduit 410 and goes to downstream cleaning or other processing if such cleaning or processing is necessary.

While the filter 360 is filtering precipitate out of the lamella effluent stream, the precipitate previously trapped in the filter 260 is washed as follows.

A basic adjusted pH water stream passes through a basic adjusted pH water conduit 280 provided with a valve 282 into the second conduit 256 and then into the filter 260. The basic adjusted pH water stream has about the same pH as that of the effluent stream from the lamella settler 244. The basic adjusted water removes mother liquor trapped within the precipitate in the filter 260 as well as associated dissolved metals that are also in the trapped mother liquor. Mother liquor is defined as the clear liquid of any liquid-precipitate mixture.

After the precipitate is washed as discussed above, the flow of basic adjusted pH water to the filter 260 is stopped, air is introduced to purge the solids and filter of free water, and then the filter 260 is opened to remove the precipitated zinc rich cake. The removed precipitate is then sent to means for storing filtered precipitate 300. The opening of the filter 260, removal, and transfer of precipitate from the filter 260 to storage means 300 are schematically represented on FIG. 3 by a precipitate conduit 290 provided with a valve 292. In actuality, filter 260 is opened allowing the precipitate to drop out of the filter onto a slab floor, and then is picked up mechanically for transfer to storage bays.

When the filter 360 achieves a sufficient pressure drop, such as 80-90 psig, the flow of the effluent from the lamella separator in the conduit 50 is diverted to the filter 260 by closing the valve 354 and opening the valve 254. By this time the filter 260 has undergone the above-described precipitate washing procedure and the washed precipitate has been removed. Then, while the lamella separator 244 effluent stream is again directed to the filter 260, the precipitate trapped in filter 360 is washed with a basic adjusted pH water stream which passes through a basic adjusted pH water conduit 380, provided with a valve 382, which leads to the second conduit 356. The basic pH adjusted water then discharges from the filter 360 through the second filtrate conduit 366 and is then diverted into a filter purge conduit 386 by opening a valve 388 of filter purge conduit 386 and closing the valve 364 of the filter effluent conduit 362. The basic adjusted pH water stream discharged from the filter 360 then recycles through the conduit 289 to the sixth agitated vessel 234.

After the precipitate in the filter 360 has been washed as described above, the flow of basic adjusted pH water from the conduit 380 is stopped by closing the valve 382, and air is introduced into the filter to remove the remaining free water. Then the precipitate trapped in the filter 360 is removed and transferred to the means for storing filtered precipitate 300. This removal and transfer is schematically represented by a precipitate conduit 390 provided with a valve 392.

Preferably, during the precipitate washing step, all the sodium is not washed out of the precipitate. Preferably some sodium is left in the precipitate because sodium facilitates downstream pelleting.

While stored in the storage means 300, the zinc hydroxide containing-filtered precipitate may incur some air drying. The dry precipitate is then transferred to means 305 for converting the zinc hydroxide in the filtered precipitate to zinc sulfate. This transfer is schematically shown as a stream 303. This conversion is accomplished by acidulating the zinc hydroxide-containing precipitate in preferably 98% sulfuric acid provided by a sulfuric acid stream 307. This partially redissolves the precipitate. Then, the pH of the mixture of precipitate and sulfuric acid is adjusted to a pH value from about 4.3 to about 4.6. This forms a supersaturated slurry of zinc sulfate, magnesium sulfate, sodium sulfate and other trace metals. Then the slurry passes through a slurry feed conduit 308 to the pelletizing means 310 which pelletizes the zinc sulfate-containing precipitate.

FIG. 4 shows pelletizing means 310 in detail. The pelletizing means 310 is alternatively employed for pelletizing the ferric hydroxide-containing precipitate and the zinc sulfate-containing precipitate. Thus, ferric hydroxide material in the stream 111 is pelletized at a different time than when the zinc-sulfate material of feed conduit 308 is pelletized. The zinc-sulfate pelletizing will be discussed in detail. It is understood that the ferric-hydroxide pelletizing would employ the same or similar steps in the equipment of FIG. 4 as described for zinc-sulfate pelletizing.

The feed conduit 308 feeds the zinc sulfate-containing precipitate cake or slurry to a mixer 420. Typically mixer 420 is a pugmill or pan mixer. Then solids in the mixer 420 discharge from mixer 420 into a conduit 422 and then pass to a dryer 430. The dried solids then pass through a conduit 432 into a screening device 440 which separates the product (pellets) from the fine particles and the oversized particles. The pelletized product is discharged from device 440 through a product conduit 442. The oversized particles pass through conduit 446 to a size reduction device 450, such as a hammer mill. After size reduction, the particles discharge from device the 450 and pass through a solids transfer conduit 452 and recycle through a conduit 454 to the mixer 420. The fines are discharged from the screening device 440, pass through a conduit 444, and then recycle through conduit 452 back into the mixer 420.

Some general process considerations are as follows. The typical iron or zinc hydroxide-containing precipitate contains from about 18 to about 25% iron or zinc hydroxide on a dried basis. The total overall liquid residence time to precipitate ferric hydroxide is about 20 to about 60 minutes. The total overall liquid residence time to precipitate zinc hydroxide is about 20 to about 60 minutes. Preferably diaphragm pumps are employed to pump streams through the process to avoid breaking flocs. Centrifugal pumps are employed for clear liquor. If desired the ferric hydroxide-containing precipitate can be filtered or settled. However it is preferable to filter the zinc floc, most preferably in a vertical plate frame filter.

The present invention provides a separation method for recovering two commercially valuable materials, iron oxide/hydroxide and zinc oxide/hydroxide either as is or converted to zinc sulfate. After their use as flocculating agents to reduce the soluble metal content in effluent waters, they may be recovered in this system to become useful materials rather than sludges for disposal. It is pointed out that zinc represents a hazardous metal in California so that it must be documented and disposed of at a limited number of sites.

An important aspect of the present invention is that it forms the hydrated metal floc at pH ranges of minimum solubility to remove it and other trace metals almost quantitatively. The use of its hydrate form to agglomerate and adsorb other metals of concern for separation is important in industrial scale operation. In the case of the ferric hydroxide, it is neutralized quickly to preferably a pH of about 5.0 and then adjusted to pH in a preferable range of about 5.2 to about 5.4. This has the advantage that either complex ferric/metal salts or insoluble, dense ferric oxide/hydroxide salts will not form preferentially. The resultant ferric hydroxide then forms a moderately dense, large floc that does not settle rapidly. However, it does provide surface for trace metal absorption and removal, particularly for selenium and vanadium. The floc is then separated from the treated water stream by filtration. Similarly, the clarified filtrate is quickly neutralized to a pH of preferably about 9.0 to about 9.2 and then adjusted to a preferable pH level of about 9.2 to about 9.4 to form the hydrated zinc hydroxide floc. This floc then picks up the fine magnesium and cadmium oxide particles that are formed by adhesion and precipitation. Within this pH range, reduced state copper is also precipitated and removed. The floc is then separated from the treated water streams by filtration. To promote more dense hydrate flocs, as disclosed above, both flocculated slurries are preferably treated with organic flocculants before filtration.

By using two pH ranges for flocculation and separation, the present process has the advantage that much lower trace metal content for the effluent may be obtained. This is highly desirable in view of the United States Environmental Protection Agency goals of reducing metal content in effluents discharged to navigable water ways. Also, by operating in these separated ranges, the two metals of primary concern, iron and zinc, may be separated for commerical use rather than discarded as wastes in a combined form. If desired, the treated waste water from the present process may be further cleaned by downstream processing such as sulfide precipitation and fluidized bed agglomeration to remove difficult metals such as mercury, silver and nickel to their lowest possible levels.

The present invention is further described by the following non-limiting examples.

EXAMPLE 1

In the laboratory, samples of the concentrated leachate solution were neutralized using various sources of neutralizing agents: sodium carbonate, sodium hydroxide, sodium bicarbonate and corresponding potassium salts. It was found that the carbonates and bicarbonates form dense precipitates within the operating range so that a separation could not be obtained. However, using the hydroxide, an iron cake was formed and filtered from a solution of pH 5.2 to 5.4. This resulted in recovering over 98% of the iron available while only small quantities remained of zinc salts, probably zinc carbonate or zinc in mother liquor trapped in the filter. Then the pH is raised from the acidic value of 5.2 to 5.4 to the 8.8 to 9.0 range to form a precipitate that is removed as a zinc cake. This removes over 99% of the remaining zinc from solution. This zinc cake included the salts of other Group II metal such as cadmium and magnesium as oxides/hydroxides. The resultant filtrate was very low in both zinc and iron so that it met the desired effluent standards of less than 5 ppm iron and 1 ppm zinc.

EXAMPLE 2

In plant scale testing, essentially 110,000 gallons of evaporation pond water at 100 plus gallon flow rates were included to process metal containing solutions to obtain a separation. After the initial pH adjustment to a range of 5.2 to 5.4, an iron cake of higher purity than found in the laboratory was recovered. The second step neutralization to a pH of 9.3 produced a zinc floc that was recovered as a higher purity cake then found previously. The resultant metal ion content of the filtrate was able to meet the levels noted above. Thus, this different neutralization and pH control process has a valuable application and separation of metal ion groups to produce usable metal components. The resultant separated cakes contain 18 to 21% solids content on a dry basis. The cakes can be dried and granulated to be more commercially salable.

One run of this plant scale testing was performed as follows.

The water contained high levels of zinc, iron and other metals and was pumped to the plant and treated with sodium hydroxide to a target pH of 5.4. Table 1 lists an analysis of the pond water. During this treatment, ferric iron and some of the other metals flocked to form a fairly dense, orange separable solid. This floc was further enhanced through the addition of flocculating agents before concentration and separation and using plate and frame filter presses. The operating pH levels ran between about 4.6 and about 4.9. This resulted in a slightly higher than anticipated iron carry through in the processed water. Also, some soluble iron was in the ferrous form. This ferrous iron could have been reduced through the addition of a small amount of hydrogen peroxide if required.

After treating and storing approximately 110,000 gallons of pond water, the system was drained and washed to removed iron-containing slurry. It was then refilled with the collected filtrate and the pH increased to the 9.4 level to precipitate the zinc based material. The system was recycled so that it came to equilibrium before processing and filtration began. The feed of stored filtrate was introduced and the system operated in a normal fashion. The zinc hydroxide floc formed as well as magnesium, copper, and cadmium hydroxide/oxides and developed into a milky white floc. The addition of flocculating agents further improved the floc density so that normal filtration through the plate and frame filter presses could occur at an economical rate.

The resultant filtrate contained less than 0.6% of the original zinc content of the solution. Similarly, the iron content was reduced to less than 0.1% of the original solution content. A greater than 99.4% removal of iron had been obtained through this processing scheme. Subsequent sulfide precipitation using the Durion process further increased this removal level to 99.9% removal of iron. Table 1 lists analyses of the pond water and filtrates.

TABLE 1

| Sample | pH | Zn (ppm) | Fe (ppm) | Cu (ppm) | Cd (ppm) |
|---|---|---|---|---|---|
| Pond Water | 2.8 | 1440 | 151 | 29.4 | 2.3 |
| 5 pH Water | 4.85 | 1350 | 19.7 | 17 | 1.8 |
| 9 pH Water | 9.5 | 4.96 | 0.13 | 0.08 | 0.03 |
| 9.4 pH Water (rerun 9 pH water at pH 9.4 after 24 hrs.) | | 0.32 | ND | ND | 0.02 |

Note:
ND (non-detectable) for Fe is 0.07 and for Cu is 0.01.

EXAMPLE 3

A second experimental run was initiated similar to the above-described Example 2 and results similar to those of Example 2 were found. Table 2 describes an analysis of the pond water, liquid filtrate separated from the iron-containing precipitate, and liquid filtrate separated from the zinc-containing precipitate.

TABLE 2

| Sample | pH | Zn (ppm) | Fe (ppm) | Cu (ppm) | Cd (ppm) | Cr (ppm) |
|---|---|---|---|---|---|---|
| Pond Water | 2.9 | 1695 | 218 | 36.3 | 0.24 | — |
| 5 pH Water | * | 1198 | 14.9 | 21.7 | 1.9 | — |
| 9 pH Water | ** | 9.8 | 0.25 | 0.17 | 0.03 | 0.004 |

Notes:
* No pH Data for composite, grab samples range from 4.6 to 4.9;
** No pH data taken for composite, grab samples range from 9.65 to 9.9 pH.

While specific embodiments of the process aspects of the present invention have been shown and described, it should be apparent that many modifications can be made thereto without departing from the spirit and scope of the invention. Accordingly, the invention is not limited by the foregoing description but it is only limited by the scope of the claims appended hereto.

We claim:

1. A process for the sequential separation of iron and zinc from acidic leachate wastewater comprising the steps of:
   a) adding a first sufficient amount of alkali metal hydroxide to acidic wastewater having a pH of less than about 4 containing ferric ions and zinc ions to raise the pH of said acidic wastewater to a first pH in the range from about 4.8 to about 5.4 to form a first precipitate, said first precipitate comprising substantially all of said ferric ions precipitated as ferric hydroxide;
   b) separating said first precipitate by filtration from said acidic wastewater having said first pH with the remainder being separated wastewater having about said first pH, said separated wastewater containing substantially all of said zinc ions in solution;
   c) adding a second sufficient amount of alkali metal hydroxide to said separated wastewater having said first pH to raise the pH of said separated wastewater to a second pH in the range from about 8.8 to about 9.4 to form a second precipitate, said second precipitate comprising substantially all of said zinc ions precipitated as zinc hydroxide; and
   d) filtering said second precipitate from said separated wastewater having said second pH.

2. The process of claim 1, wherein said first pH is in the range from about 5.0 to about 5.4

3. The process of claim 2, wherein said second pH is in the range from about 9.3 to about 9.4.

4. The process of claim 3, wherein said first pH is in the range from about 5.2 to about 5.4.

5. The process of claim 3, wherein said first precipitate is separated by passing a stream, comprising said first precipitate and said wastewater having said first pH, horizontally through a first filter comprising a vertical filter medium.

6. The process of claim 5, wherein said separated first precipitate is washed with wash water having a pH about equal to said first pH.

7. The process of claim 3, wherein said second precipitate is filtered by passing a stream, comprising said second precipitate and said wastewater having said second pH, horizontally through a second filter comprising a vertical filter medium.

8. The process of claim 7, wherein said filtered second precipitate is washed with wash water having a pH about equal to said second pH.

9. The process of claim 8, further comprising the steps of:

a) acidulating said filtered second precipitate by mixing said filtered second precipitate with sufficient sulfuric acid to redissolve at least a portion of said filtered second precipitate;
b) raising the pH of the mixture of said filtered second precipitate to a third pH in the range from about 4.3 to about 4.6 to form a supersaturated slurry comprising solids which comprise zinc sulfate; and
c) pelletizing said solids.

10. The process of claim 2, wherein said alkali metal hydroxide is sodium hydroxide, and achieving said first pH comprises the steps of:
a) mixing a stream of said acidic wastewater, having said pH of less than about 4, with a first stream comprising sodium hydroxide in a first agitated vessel to form a first mixture having a pH of about 4.0 to about 5.0 in said first agitated vessel;
b) discharging a first effluent stream, comprising said first mixture, from said first agitated vessel;
c) mixing said first effluent stream with a second stream comprising sodium hydroxide in a second agitated vessel to form a second mixture having a pH of about 5.0 to about 5.4 in said second agitated vessel; and
d) discharging a second effluent stream, comprising said second mixture, from said second agitated vessel.

11. The process of claim 10, wherein
said second effluent stream is fed to a third agitated vessel; and
then discharged from said third agitated vessel as a third effluent stream.

12. The process of claim 11, wherein achieving said first pH further comprises the step of mixing said second effluent stream with a third stream comprising sodium hydroxide in said third agitated vessel to form a third mixture having a pH of at most about 5.4.

13. The process of claim 11, wherein the total residence time of said mixture in said first, second and third vessels ranges from about 20 to about 60 minutes.

14. The process of claim 13, wherein said total resident time ranges from about 30 to about 50 minutes and said first, second and third vessels operate at ambient temperature and pressure.

15. The process of claim 14, further comprising mixing said third effluent stream with an organic flocculent.

16. The process of claim 10, wherein achieving said second pH comprises the steps of:
a) mixing said separated wastewater having about said first pH with a fourth stream comprising sodium hydroxide in a fourth agitated vessel to form a fourth mixture having a pH of about 8.9 to about 9.1;
b) discharging a fourth effluent stream comprising said fourth mixture from said fourth agitated vessel;
c) mixing said fourth effluent stream with a fifth stream comprising sodium hydroxide in a fifth agitated vessel to form a fifth mixture having a pH of about 9.3 to about 9.4;
d) discharging a fifth effluent stream comprising said fifth mixture from said fifth agitated vessel;

17. The process of claim 16, wherein
said fifth effluent stream is fed to a sixth agitated vessel, and then discharged from said sixth agitated vessel as a sixth effluent stream.

18. The process of claim 17, wherein achieving said second pH further comprises the step of mixing said fifth effluent stream with a sixth stream comprising sodium hydroxide in said sixth agitated vessel to form a sixth mixture having a pH of at most about 9.4.

19. The process of claim 17, wherein the total residence time of said mixtures in said fourth vessel, said fifth vessel and said sixth vessel ranges from about 20 to about 60 minutes.

20. The process of claim 19, wherein said total residence time ranges from about 30 to about 50 minutes and said fourth, fifth and sixth vessels operate at ambient temperature and pressure.

21. The process of claim 18, further comprising mixing an organic flocculent with said sixth effluent stream.

22. A continuous process for sequential separation of iron and zinc from acidic leachate wastewater comprising the steps of:
a) mixing a stream of an acidic wastewater having a pH of less than about 4 with a first stream comprising sodium hydroxide in a first continuous agitated vessel to form a first mixture having a pH of about 4.0 to about 5.0 in said first agitated vessel, said first agitated vessel providing a first mixture residence time from about 15 to about 25 minutes;
b) discharging a first effluent stream, comprising said first mixture, from said first agitated vessel;
c) mixing said first effluent stream with a second stream comprising sodium hydroxide in a second continuous agitated vessel to form a second mixture having a pH of about 5.0 to about 5.1 in said second agitated vessel, said second agitated vessel providing a second mixture residence time from about 10 to about 20 minutes;
d) discharging a second effluent stream, comprising said second mixture, from said second agitated vessel;
e) mixing said second effluent stream with a third stream of sodium hydroxide in a third continuous agitated vessel to form a third mixture having a pH as high as about 5.4, said third agitated vessel providing a third mixture residence time from about 5 to about 15 minutes;
f) discharging a third effluent stream, comprising said third mixture, from said third agitated vessel;
g) forming a first precipitate, which comprises substantially all of said ferric ions precipitated as ferric hydroxide, within said first, second and third vessels, from said first, second and third mixtures, wherein said first, second, and third vessels operate at ambient temperature and pressure;
h) adding a first organic flocculent to said third effluent stream;
i) passing said third effluent stream horizontally through a first filter comprising a vertical filter medium to separate said first precipitate from said third effluent stream and to form a first filtrate stream containing substantially all of said zinc ions in solution;
j) mixing said first filtrate stream with a fourth stream comprising sodium hydroxide in a fourth continuous agitated vessel to form a fourth mixture having a pH of about 8.9 to about 9.1, said fourth agitated vessel providing a fourth mixture residence time from about 15 to about 20 minutes;
k) discharging a fourth effluent stream comprising said fourth mixture from said fourth agitated vessel;
l) mixing said fourth effluent stream with a fifth stream comprising sodium hydroxide in a fifth continuous agitated vessel to form a fifth mixture having a pH of about 9.3 to about 9.4, said fifth agitated vessel providing a fifth mixture residence time from about 10 to about 20 minutes;

m) discharging a fifth effluent stream comprising said fifth mixture from said fifth agitated vessel;

n) mixing said fifth effluent stream with a sixth stream comprising sodium hydroxide in a sixth continuous agitated vessel to form a sixth mixture having a pH as high as about 9.4, said sixth agitated vessel providing a sixth mixture residence time from about 5 to about 15 minutes;

o) discharging a sixth effluent stream, comprising said sixth mixture, from said sixth agitated vessel;

p) forming a second precipitate, which comprises substantially all of said zinc ions precipitated as zinc hydroxide, within said fourth, fifth and sixth vessels, from said fourth, fifth and sixth mixtures, wherein said fourth, fifth and sixth vessels operate at ambient temperature and pressure;

q) adding a second organic flocculent to said sixth effluent stream; and r) passing said sixth effluent stream horizontally through a second filter comprising a vertical filter medium to separate said second precipitate from said sixth effluent stream and form a second filtrate stream.

23. The process of claim 1, wherein said acidic leachate wastewater is from a mining leachate collection pond.

24. The process of claim 23, wherein said acidic leachate wastewater has a zinc concentration from about 1400 to about 1700 ppm and iron concentration from about 150 to about 220 ppm.

25. A process for the sequential separation of iron and zinc from acidic leachate wastewater comprising the steps of:
a) adding a first sufficient amount of alkali metal hydroxide to acidic wastewater having a pH of less than about 4 containing ferric ions and zinc ions to raise the pH of said acidic wastewater to a first pH in the range from about 4.8 to about 5.4 to form a first precipitate, said first precipitate comprising substantially all of said ferric ions precipitated as ferric hydroxide;

b) separating said first precipitate from said acidic wastewater having said first pH with the remainder being separated wastewater having about said first pH, said separated wastewater containing substantially all of said zinc ions in solution;

c) adding a second sufficient amount of alkali metal hydroxide to said separated wastewater having said first pH to raise the pH of said separated wastewater to a second pH in the range from about 8.8 to about 9.4 to form a second precipitate, said second precipitate comprising substantially all of said zinc ions precipitated as zinc hydroxide;

d) filtering said second precipitate from said separated wastewater having said second pH;

e) acidulating said filtered second precipitate by mixing said filtered second precipitate with sulfuric acid to redissolve at least a portion of said filtered second precipitate; and f) raising the pH of the mixture of said filtered second precipitate to a third pH in the range from about 4.3 to about 4.6 to form a supersaturated slurry comprising solids which comprise zinc sulfate.

26. The process of claim 25, further comprising pelletizing said solids which comprise zinc sulfate.

27. A process for the sequential separation of iron and zinc from acidic leachate wastewater comprising the steps of:
a) mixing a stream of said acidic wastewater, having said pH of less that about 4, with a first stream comprising sodium hydroxide to form a first mixture having a first pH of about 4.0 to about 5.0;

b) mixing said first mixture with a second stream comprising sodium hydroxide to form a second mixture having a second pH of about 4.8 to about 5.4, thereby forming a first precipitate comprising substantially all of said ferric ions precipitated as ferric hydroxide;

c) separating said first precipitate from said acidic wastewater having said second pH with the remainder being separated wastewater having about said second pH, said separated wastewater containing substantially all of said zinc ions in solution;

d) adding a sufficient amount of alkali metal hydroxide to said separated wastewater having said second pH to raise the pH of said separated wastewater to a third pH in the range from about 8.8 to about 9.4 to form a second precipitate, said second precipitate comprising substantially all of said zinc ions precipitated as zinc hydroxide; and e) filtering said second precipitate from said separated wastewater having said third pH.

28. A process for the sequential separation of iron and zinc from acidic leachate wastewater comprising the steps of:
a) mixing a stream of said acidic wastewater, having said pH of less than about 4, with a first stream comprising sodium hydroxide in a first agitated vessel to form a first mixture having a first pH of about 4.0 to about 5.0 in said first agitated vessel;

b) discharging a first effluent stream, comprising said first mixture, from said first agitated vessel;

c) mixing said first effluent stream with a second stream comprising sodium hydroxide in a second agitated vessel to form a second mixture having a second pH of about 4.8 to about 5.4 in said second agitated vessel, thereby forming a first precipitate comprising substantially all of said ferric ions precipitated as ferric hydroxide;

d) discharging a second effluent stream, comprising said second mixture, from said second agitated vessel;

e) separating said first precipitate from said acidic wastewater having said second pH with the remainder being separated wastewater having about said second pH, said separated wastewater containing substantially all of said zinc ions in solution;

f) adding a sufficient amount of alkali metal hydroxide to said separated wastewater having said second pH to raise the pH of said separated wastewater to a third pH in the range from about 8.8 to 9.4 to form a second precipitate, said second precipitate comprising substantially all of said zinc ions precipitated as zinc hydroxide; and g) filtering said second precipitate from said separated wastewater having said third pH.

29. The process of claim 1, wherein at least about 87% of said ferric ions are precipitated as ferric hydroxide during step (a).

30. The process of claim 29, wherein said separated wastewater of step (b) contains at least about 93% of said zinc ions in solution.

31. The process of claim 30, wherein at least about 99% of said zinc ions in said separated wastewater are precipitated as zinc hydroxide during step (c).

* * * * *